US009582509B2

(12) United States Patent
Hirose

(10) Patent No.: US 9,582,509 B2
(45) Date of Patent: Feb. 28, 2017

(54) DATA MIGRATION MANAGEMENT

(75) Inventor: Haruto Hirose, Yokohama (JP)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 917 days.

(21) Appl. No.: 13/808,418

(22) PCT Filed: Aug. 21, 2012

(86) PCT No.: PCT/US2012/051692
§ 371 (c)(1),
(2), (4) Date: Jan. 4, 2013

(87) PCT Pub. No.: WO2014/031101
PCT Pub. Date: Feb. 27, 2014

(65) Prior Publication Data
US 2014/0236901 A1 Aug. 21, 2014

(51) Int. Cl.
*G06F 17/30* (2006.01)
(52) U.S. Cl.
CPC ...... *G06F 17/30079* (2013.01); *G06F 17/303* (2013.01)
(58) Field of Classification Search
CPC ............. G06F 17/30079; G06F 17/303; G06F 17/30569; G06F 17/2785; G06F 11/203; G06F 17/30914; G06F 17/30917; G06F 17/30563; G06F 3/0647; G06Q 30/0601; G06Q 30/00; G06Q 30/06; G06Q 30/0641; G06Q 30/0282; G06Q 30/0643; H04L 63/0263
USPC ...................................................... 707/654
See application file for complete search history.

(56) References Cited

U.S. PATENT DOCUMENTS

| 6,938,039 B1 | 8/2005 | Bober et al. |
| 2004/0199905 A1 | 10/2004 | Fagin et al. |
| 2005/0060647 A1* | 3/2005 | Doan ................ G06F 17/30557 715/205 |
| 2005/0222928 A1 | 10/2005 | Steier et al. |

(Continued)

FOREIGN PATENT DOCUMENTS

| CN | 1188575 A | 7/1998 |
| CN | 1763685 A | 4/2006 |

(Continued)

OTHER PUBLICATIONS

International Search Report & Written Opinion dated Aug. 21, 2012 for PCT/US12/51692.

(Continued)

*Primary Examiner* — Evan Aspinwall
(74) *Attorney, Agent, or Firm* — Brundidge & Stanger, P.C.

(57) ABSTRACT

Technologies are generally described for managing data migration between databases. In some examples, a data migration management system may include a data migration management unit configured to manage a migration of data stored in a first database to a second database, a game management unit configured to design a game for the migration of at least some of the data managed by the data migration management unit and to provide the designed game to a player, and a player management unit configured to manage participation of the player for the game designed by the game management unit.

26 Claims, 5 Drawing Sheets

(56) References Cited

U.S. PATENT DOCUMENTS

| | | | |
|---|---|---|---|
| 2005/0256892 A1* | 11/2005 | Harken | G06F 17/303 |
| 2007/0077993 A1 | 4/2007 | Midgley et al. | |
| 2007/0299975 A1 | 12/2007 | Daschakowsky et al. | |
| 2008/0181107 A1* | 7/2008 | Moorthi et al. | 370/231 |
| 2009/0054123 A1* | 2/2009 | Mityagin | A63F 13/12 |
| | | | 463/9 |
| 2010/0082543 A1 | 4/2010 | Nagarajan | |
| 2012/0095973 A1* | 4/2012 | Kehoe et al. | 707/694 |
| 2012/0101952 A1* | 4/2012 | Raleigh | G06Q 30/016 |
| | | | 705/304 |
| 2012/0303491 A1* | 11/2012 | Hill | G06Q 30/06 |
| | | | 705/27.2 |

FOREIGN PATENT DOCUMENTS

| | | |
|---|---|---|
| CN | 1831863 A | 9/2006 |
| WO | 9633561 A | 10/1996 |
| WO | 9933041 A2 | 7/1999 |
| WO | 9952060 A | 10/1999 |
| WO | 0140948 A | 6/2001 |

OTHER PUBLICATIONS

Elena Simperl et al. "Crowdsourcing tasks in Linked Data management" Institute AIFB, Karslruhe Institute of Technology, Germany Ontotext AD, Bulgaria, 12 pages, 2011.

Firas Khatib et al., Brief Communications, Nature America Inc. "Crystal structure of a monomeric retroviral protease solved by protein folding game players", pp. 1175-1178, 2011.

"InnoCentive," accessed at https://web.archive.org/web/20120817053616/http://www.innocentive.com/, accessed on Jan. 22, 2015, pp. 2.

* cited by examiner

DATA MIGRATION MANAGEMENT

CROSS-REFERENCE TO RELATED APPLICATIONS

The Application is a U.S. National Stage filing under 35 U.S.C. §371 of International Application No. PCT/US12/51692, filed Aug. 21, 2012.

BACKGROUND

Data migration is a process of transferring data between databases. Such a process is required when organizations change, upgrade, or even merge their computer systems.

When migrating data stored in a source database to a destination database, it is necessary to extract the data from the source database, modify the extracted data in accordance with a nature or system format of the destination database, and load the modified data onto the destination database.

SUMMARY

In an example, a data migration management system may include a data migration management unit configured to manage a migration of data stored in a first database to a second database, a game management unit configured to design a game for the migration of at least some of the data managed by the data migration management unit and to provide the designed game to a player, and a player management unit configured to manage participation of the player for the game designed by the game management unit.

In another example, a method performed under control of a data migration management system may include designing an application for migrating a portion of data stored in a first database to a second database, the portion of data entailing a semantic difference between the first database and the second database; and designing a game based at least in part on the designed application.

In yet another example, a computer-readable storage medium may store thereon computer-executable instructions that, in response to execution, cause a data migration management system to perform operations, including classifying data stored in a first database into a first portion of data and a second portion of data, the first portion of data being applicable to a bulk migration to a second database and the second portion of data necessitating semantic interpretation for a migration to the second database; and providing a player with a game designed for the migration of the second portion of data to the second database.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
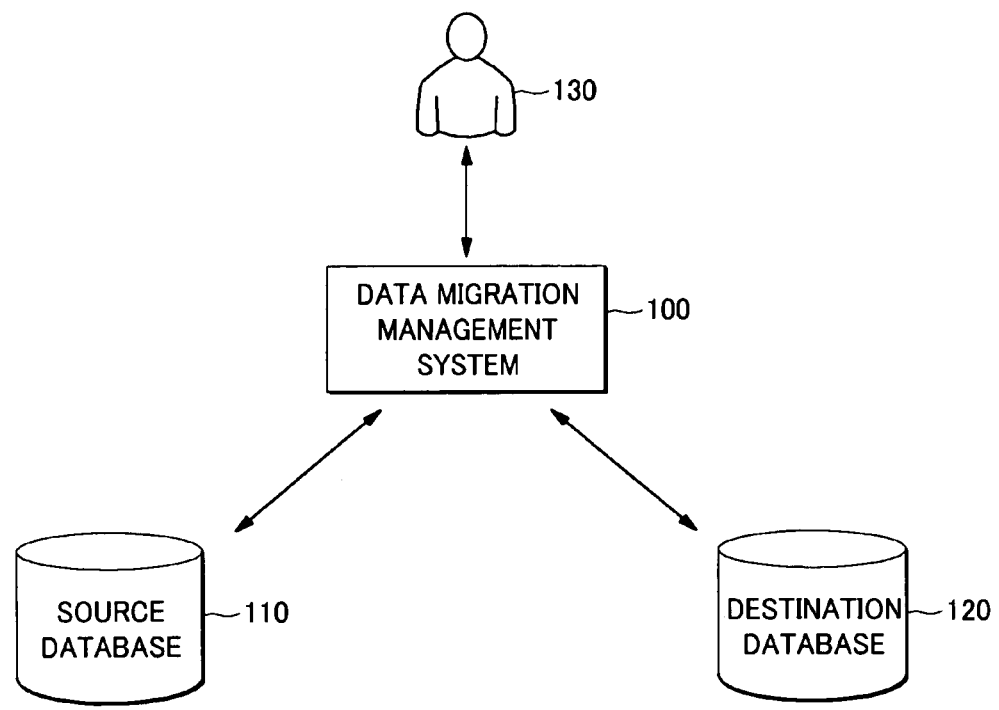
FIG. 1 schematically shows an illustrative example of an environment in which a data migration management system manages data migration between databases, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a data migration between databases.

Technologies are generally described for managing a data migration from a source database to a destination database based at least in part on crowd-sourcing.

In some examples, a data migration management system may manage a migration of data stored in the source database to the destination database. The data migration management system may design how to migrate the data stored in the source database to the destination database.

In some examples, the data migration management system may classify the data stored in the source database into a first portion of data applicable to a bulk migration to the destination database and a second portion of data necessitating semantic interpretation for the migration due to a semantic difference between the source database and the destination database. In some examples, the semantic difference between the source database and the destination database may be associated with compatibility between the data stored in the source database and a data storage policy of the destination database. By way of example, but not limitation, when the source database stores a human name without classification of a family name and a given name (e.g., Name: JOHNDOE), while the destination database separately stores a family name and a given name (e.g., Family Name: DOE; Given Name: JOHN), data associated with human names stored in the source database may entail the semantic difference between the source database and the destination database. Similar issues may also arise with addresses.

In some examples, such a semantic difference may be resolved by crowd-sourcing. That is, the data migration management system may invite a crowd of people for resolving the semantic difference. By way of example, but not limitation, the data migration management system may provide a game associated with the semantic difference to the crowd of people via a gaming platform.

In some examples, the data migration management system may design an application for the migration of the second portion of data. The data migration management system may design the application based at least in part on how to resolve the semantic difference between the source database and the destination database.

In some examples, the data migration management system may design the game based at least in part on the designed application, and provide the designed game to a player. By way of example, but not limitation, for the migration of a name "JOHNDOE" stored in the source database to the destination database, the data storage policy of which is storing a family name and a given name separately, the data migration management system may design the game including a question, e.g., "How can you divide the name JOHNDOE into a family name and a given name?" etc., as a mission.

In some examples, the data migration management system may provide to the player other questions related to the previous question such as, for example, "How can you divide the name JANEDOE into a family name and a given name?" or "How can you divide the name JOHNDOE into a family name and a given name?" etc., so as to decide a correct answer for the previous question and/or to enhance a reliability or accuracy thereof. By way of example, but not limitation, when the player's answers repeatedly indicate that DOE is the family name and JOHN is the given name, the data migration management system may decide that the answer for the previous question is correct and reliable.

In some examples, the data migration management system may provide the same question to multiple players so as to decide the correct answer for the question and/or to enhance the reliability or accuracy thereof. By way of example, but not limitation, when answers of more than a predetermined portion (e.g., 90%) of players indicate that "DOE" is the family name of "JOHNDOE" and "JOHN" is the given name of "JOHNDOE," the data migration management system may decide that "DOE" is the family name of "JOHNDOE" and "JOHN" is the given name of "JOHNDOE." In such cases, the data migration management system may determine "JOHN" and "DOE" as a family name gene and a given name gene, respectively. The family name gene and the given name gene may respectively be defined as sequence of character(s) forming family names and given names.

In some examples, the data migration management system may migrate the second portion of data from the source database to the destination database based at least in part on how the player plays the game. By way of example, but not limitation, when the player completes the mission by answering to the question, and the data migration management system determines "JOHN" and "DOE" respectively as the family name gene and the given name gene, as described above, the data migration management system may write or load onto the destination database "JOHN" and "DOE" respectively as the family name and the given name of "JOHNDOE."

In some examples, the data migration management system may revise or update the application based at least in part on a result of playing of the game by the player. By way of example, but not limitation, when the player completes the mission by answering to the question, and the data migration management system determines "JOHN" and "DOE" respectively as the family name gene and the given name gene, the data migration management system may revise the application, if necessary, so that the migration from then on may identify "JOHN" and "DOE" in other names as a family name and a given name, respectively. By way of example, but not limitation, the data migration management system may identify a family name "DOE" from a name "JANEDOE" stored in the source database, based on the family name gene.

In some examples, the data migration management system may also revise or update the game, or generate a new game based at least in part on the revised application. By way of example, but not limitation, the data migration management system may revise the question to, e.g., "Is the family name of JANEDOE DOE?" etc.

In some examples, the data migration management system may provide a predetermined award to the player when the player has successfully accomplished the mission of the game. By way of example, but not limitation, the predetermined award may include game items, points to be used for playing the game, points to be used for transaction of the applications and/or games, and so on.

In some examples, the data migration management system may charge the player for the game. In some examples, the data migration management system may design a market in which the player buys or sells the game and manage the market.

FIG. 1 schematically shows an illustrative example of an environment in which a data migration management system manages data migration between databases, arranged in accordance with at least some embodiments described herein.

As depicted, a data migration management system 100 may manage or control a migration of data stored in a source database 110 to a destination database 120. Examples of source database 110 and/or destination database 120 may include, but are not limited to, a cloud database, a data warehouse, a distributed database, a document-oriented database, a federated database, and so on. By way of example, but not limitation, the migration of the data stored in source database 110 to destination database 120 may be performed when an organization using source database 110 merges with another organization using destination database 120, or the organization wants to update its system to use destination database 120.

In some embodiments, data migration management system 100 may manage the data stored in source database 110. By way of example, but not limitation, data migration management system 100 may organize and/or identify a data structure of the data stored in source database 110, and/or a data storage policy of source database 110.

In some embodiments, data migration management system 100 may design a migration process from source database 110 to destination database 120. In some embodiments, data migration management system 100 may identify a semantic difference between source database 110 and destination database 120, and classify the data stored in source database 110 into a first portion of data being applicable to a bulk migration to destination database 120 and a second portion of data necessitating semantic interpretation for the migration to destination database 120.

Then, data migration management system 100 may execute the bulk migration for the first portion of data, while design an application for the migration of the second portion of data. In some embodiments, data migration management system 100 may determine whether the designed application properly performs the migration, for example, by calculating an error rate.

In some embodiments, data migration management system 100 may design a game based at least in part on the designed application, and provide the designed game to a player 130 via a gaming platform. Player 130 may then play the game by accessing the gaming platform via, for example, the Internet. In such cases, data migration management system 100 may use a result of playing of the game by player 130 for the migration of the second portion of data. In some embodiments, data migration management system 100 may manage registration of the game and/or the application used for the game.

In some embodiments, data migration management system 100 may manage registration and status of player 130. In some embodiments, data migration management system 100 may charge player 130 for the game, and manage billing based on, for example, a usage rate. In some embodiments, data migration management system 100 may design a market in which player 130 may buy or sell the game and/or the application, and manage the market.

In some embodiments, data migration management system 100 may provide a predetermined award to player 130 when he/she has successfully accomplished a mission of the game. By way of example, but not limitation, the predetermined award may include game items, points to be used for playing the game, points to be used for transaction of the applications and/or games, and so on.

By way of example, but not limitation, it may be assumed that data migration management system 100 identifies a semantic difference between source database 110 and destination database 120 in terms of storing names in a database. Specifically, it may be assumed that source database 110 stores a names without classifying family names and given names (e.g., Name: JOHNDOE), while a data storage policy of destination database 120 requires family names and given names (e.g., Family Name: DOE; Given Name: JOHN) be stored separately. In such cases, data migration management system 100 may outsource the migration of data associated with the names via the gaming platform and migrate, in bulk, other portions of data, which do not necessitate semantic interpretation for the migration.

By way of example, but not limitation, data migration management system 100 may design the game to include a mission, such as a question to be answered by player 130. An example of the question may include, but are not limited to, "How can you divide the name JOHNDOE into a family name and a given name?" Then, when player 130 answers to the question, data migration management system 100 may revise or update the application based on the answer for the migration of the data associated with the names. Depending on the desired implementation, player 130 may test or execute the revised application to validate whether the revised application properly migrates the data from source database 110 to destination database 120.

By way of example, but not limitation, when the answer of player 130 indicates that "DOE" and "JOHN" are respectively the family name and the given name of "JOHNDOE," data migration management system 100 may determine whether the answer is correct and/or reliable. Then, when data migration management system 100 determines that the answer is correct, data migration management system 100 may provide the predetermined award to player 130 and determine "JOHN" and "DOE" as a family name gene and a given name gene, respectively. In such cases, data migration management system 100 may revise the application so that the migration from then on may identify "JOHN" and "DOE" in other names (e.g., "JANEDOE") as a family name and a given name, respectively. That is, data migration management system 100 may identify a family name "DOE" from the name "JANEDOE" in source database 110, based on the family name gene "DOE." Depending on the desired implementation, data migration management system 100 may revise the question to, e.g., "Is the family name of JANEDOE DOE?" etc.

Figure 2:
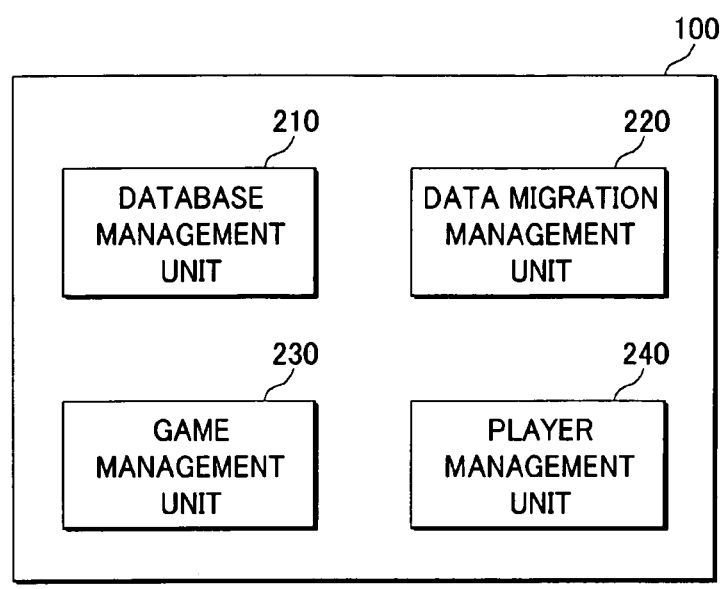
FIG. 2 shows a schematic block diagram illustrating an example architecture of a data migration management system for managing data migration between databases, arranged in accordance with at least some embodiments described herein.

FIG. 2 shows a schematic block diagram illustrating an example architecture of a data migration management system for managing data migration between databases, arranged in accordance with at least some embodiments described herein.

As depicted, data migration management system 100 may include a database management unit 210, a data migration management unit 220, a game management unit 230, and a player management unit 240. Although illustrated as discrete components, various components may be divided into additional components, combined into fewer components, or eliminated while being contemplated within the scope of the disclosed subject matter.

Database management unit 210 may be configured to manage data stored in a first database (e.g., source database 110). By way of example, but not limitation, database management unit 210 may organize and/or identify a data structure of the data stored in the first database and/or a data storage policy of the first database.

Data migration management unit 220 may be configured to manage a migration of data stored in the first database to a second database (e.g., destination database 120). In some embodiments, data migration management unit 220 may be configured to design a migration process for at least some of the data that entails a semantic difference between the first database and the second database. By way of example, but not limitation, the semantic difference between the first database and the second database is associated with compatibility between the data stored in the first database and a data storage policy of the second database.

In some embodiments, data migration management unit 220 may design an application for the migration of the data based at least in part on the designed migration process. In some embodiments, data migration management unit 220 may also determine whether the designed application properly migrates the data stored in the first database to the second database.

Game management unit 230 may be configured to design a game for the migration based at least in part on the application designed by data migration management unit 220. In some embodiments, game management unit 230 may design the game to include a mission associated with the semantic difference between the first database and the second database. Game management unit 230 may also be configured to provide the designed game to a player (e.g., player 130).

Player management unit 240 may be configured to manage participation of the player for the game designed by game management unit 230. In some embodiments, player management unit 240 may be further configured to manage registration of the player.

In some embodiments, player management unit 240 may manage charging or billing for the player. Player management unit 240 may charge the player for the game, and manage the billing based on, for example, a usage rate.

In some embodiments, player management unit 240 may design a market in which the player may buy or sell the game and/or the application, and manage the market. In some embodiments, player management unit 240 may provide a predetermined award to the player when the player has successfully accomplished the mission of the game.

Figure 3:
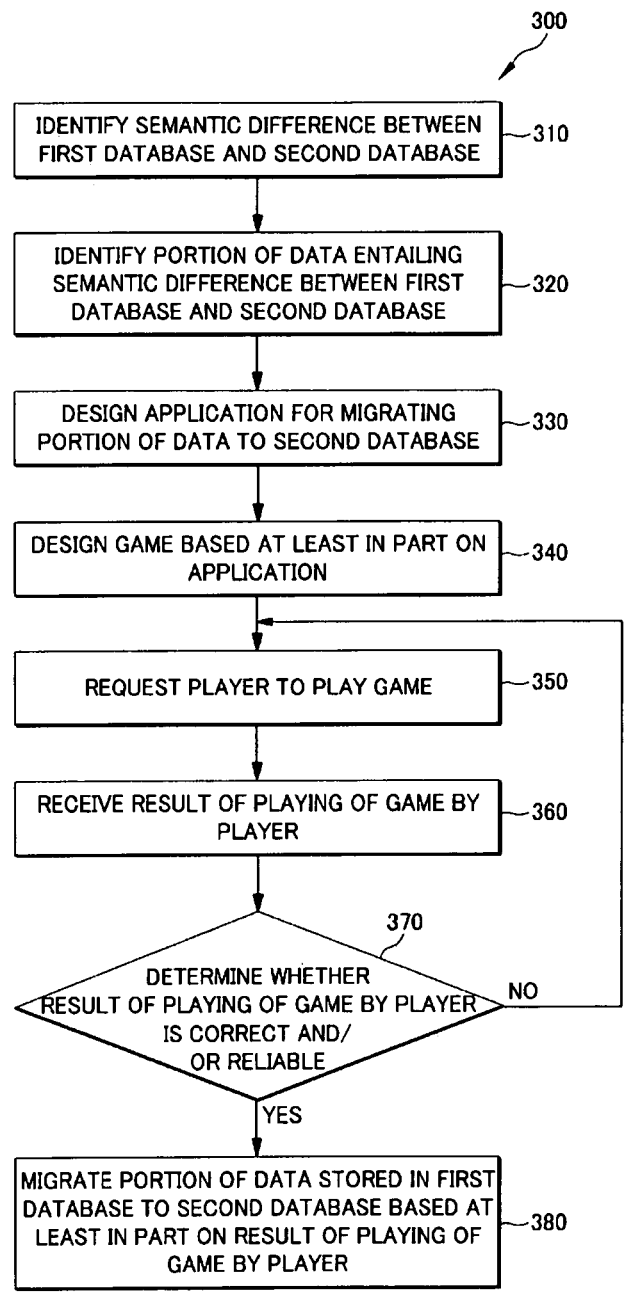
FIG. 3 shows an example flow diagram of a process for providing a data migration management scheme, arranged in accordance with at least some embodiments described herein.

FIG. 3 shows an example flow diagram of a process for providing a data migration management scheme, arranged in accordance with at least some embodiments described herein.

The process in FIG. 3 may be implemented in a data migration management system such as data migration management system 100 including database management unit 210, data migration management unit 220, game management unit 230, and player management unit 240, described above. An example process 300 may include one or more operations, actions, or functions as illustrated by one or more blocks 310, 320, 330, 340, 350, 360, 370 and/or 380. Although illustrated as discrete blocks, various blocks may be divided into additional blocks, combined into fewer blocks, or eliminated, depending on the desired implementation. Processing may begin at block 310.

At block 310 (Identify Semantic Difference between First Database and Second Database), the data migration management system may identify a semantic difference between a first database (e.g., source database 110) and a second database (e.g., destination database 120). By way of example, but not limitation, the semantic difference between the first database and the second database may be associated with compatibility between data stored in the first database and a data storage policy of the second database. Processing may continue from block 310 to block 320.

At block 320 (Identify Portion of Data Entailing Semantic Difference between First Database and Second Database), the data migration management system may identify, from the data stored in the first database, a portion of data entailing the semantic difference between the first database and the second database. Processing may continue from block 320 to block 330.

At block 330 (Design Application for Migrating Portion of Data to Second Database), the data migration management system may design an application for migrating to the second database the portion of data entailing the semantic difference between the first database and the second database. Processing may continue from block 330 to block 340.

At block 340 (Design Game based at least in part on Application), the data migration management system may design a game based at least in part on the designed application. By way of example, but not limitation, the data migration management system may design the game so as to include a mission associated with the semantic difference between the first database and the second database. Processing may continue from block 340 to block 350.

At block 350 (Request Player to Play Game), the data migration management system may request a player (e.g., player 130) to play the designed game. Processing may continue from block 350 to block 360.

At block 360 (Receive Result of Playing of Game by Player), the data migration management system may receive a result of playing of the game by the player. Processing may continue from block 360 to block 370.

At block 370 (Determine Whether Result of Playing of Game by Player Is Correct and/or Reliable), the data migration management system may determine whether the result of playing of the game by the player is correct and/or reliable. When the data migration management system determines that the result of playing of the game by the player is correct and/or reliable, processing may continue to block 380. Otherwise, processing may continue to block 350.

At block 380 (Migrate Portion of Data Stored in First Database to Second Database based at least in part on Result of Playing of Game by Player), the data migration management system may migrate the portion of data stored in the first database to the second database based at least in part on the received result of playing of the game by the player.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
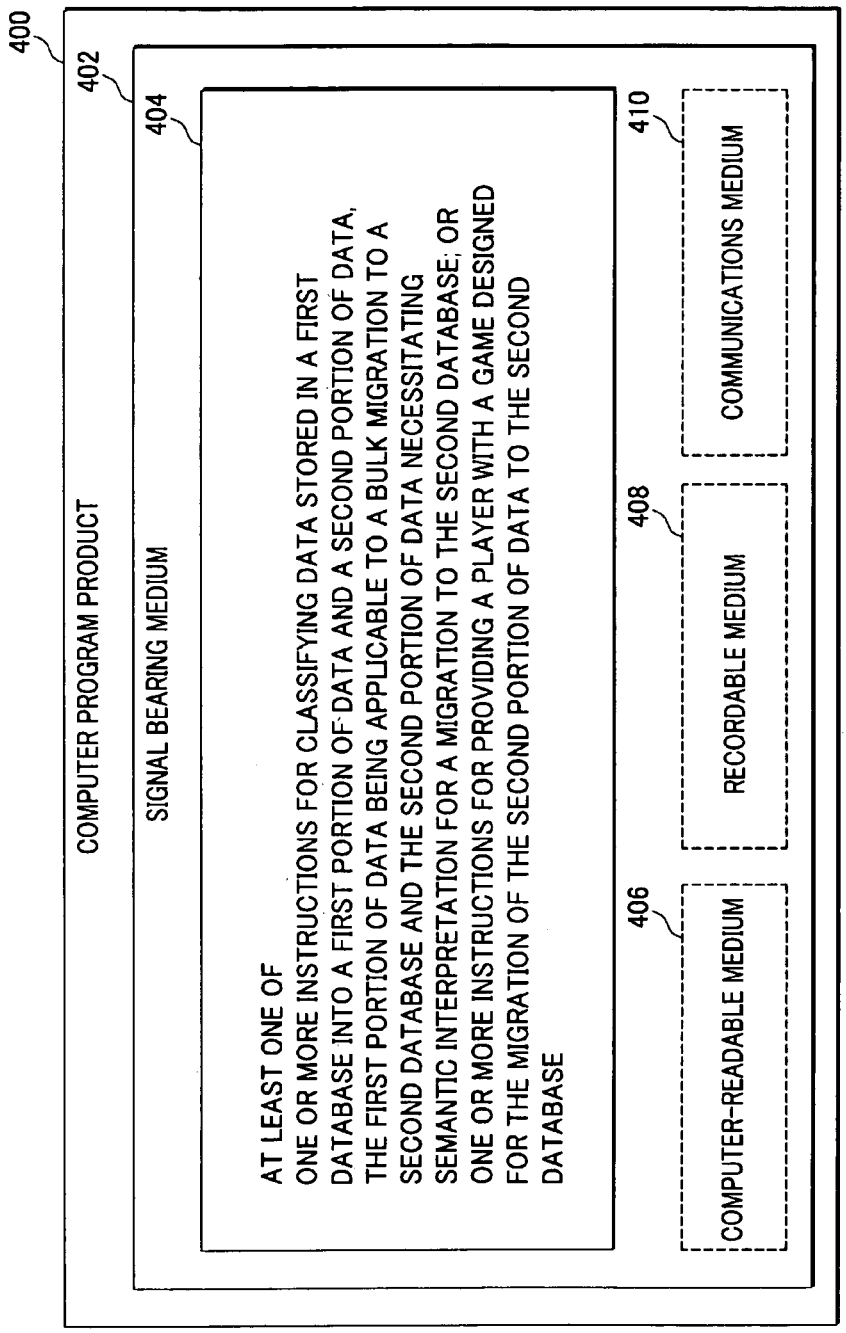
FIG. 4 illustrates an example computer program product that may be utilized to provide a data migration management scheme, arranged in accordance with at least some embodiments described herein.

FIG. 4 illustrates an example computer program product that may be utilized to provide a data migration management scheme, arranged in accordance with at least some embodiments described herein.

Computer program product 400 may include a signal bearing medium 402. Signal bearing medium 402 may include one or more instructions 404 that, when executed by, for example, a processor, may provide the functionality described above with respect to FIGS. 1-3. By way of example, instructions 404 may include: one or more instructions for classifying data stored in a first database into a first portion of data and a second portion of data, the first portion of data being applicable to a bulk migration to a second database and the second portion of data necessitating semantic interpretation for a migration to the second database; or one or more instructions for providing a player with a game designed for the migration of the second portion of data to the second database. Thus, for example, referring to FIG. 2, data migration management system 100 may undertake one or more of the blocks shown in FIG. 3 in response to instructions 404.

In some implementations, signal bearing medium 402 may encompass a computer-readable medium 406, such as, but not limited to, a hard disk drive, a CD, a DVD, a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, computer program product 400 may be conveyed to one or more modules of data migration management system 100 by an RF signal bearing medium 402, where the signal bearing medium 402 is conveyed by a wireless communications medium 410 (e.g., a wireless communications medium conforming with the IEEE 802.11 standard).

Figure 5:
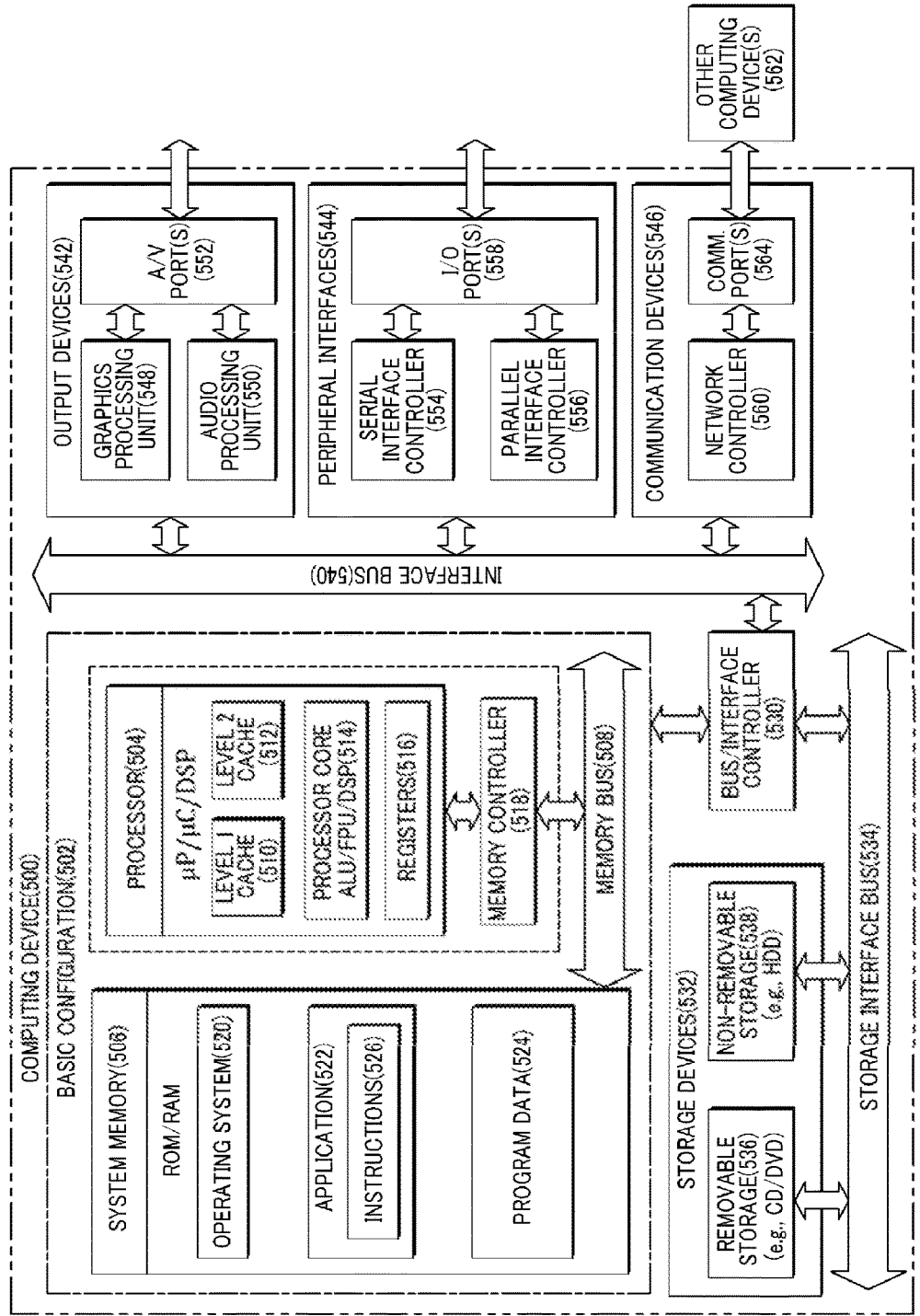
FIG. 5 is a block diagram illustrating an example computing device that may be utilized to provide a data migration management scheme, arranged in accordance with at least some embodiments described herein.

FIG. 5 is a block diagram illustrating an example computing device that may be utilized to provide a data migration management scheme, arranged in accordance with at least some embodiments described herein.

In these examples, elements of a computing device 500 may be arranged or configured for a database server. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include instructions 526 that may be arranged to perform the functions as described herein including the actions described with respect to the data migration management system 100 architecture as shown in FIG. 2 or including the actions described with respect to the flow charts shown in FIG. 3. In some examples, application 522 may be arranged to operate with program data 524 on an operating system 520 such that implementations for instructions for an electronic device as described herein.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may, also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A data migration management system, comprising:
   a data migration management unit configured to:
      identify a semantic difference between a first database and a second database,
      classify data stored in the first database into a first portion of bulk data applicable to a bulk migration to the second database and a second portion of data necessitating semantic interpretation, suitable for a game, for a migration to the second database, and
      design a migration application for the second portion of data based at least on the semantic difference between the first database and a second database, the semantic difference being associated with a compatibility between a data structure of the second portion of data and a data storage policy of the second database;
   a game management unit configured to:
      design the game to include a mission associated with the semantic difference between the first database and a second database for a migration of the second portion of data based on the migration application, and
      provide the designed game for playing by a player; and
   a player management unit configured to manage participation of the player for the game designed by the game management unit.

2. The data migration management system of claim 1, further comprising:
   a database management unit configured to manage the data stored in the first database.

3. The data migration management system of claim 1, wherein the migration application is configured to resolve the semantic difference between the first database and the second database.

4. The data migration management system of claim 1, wherein the migration application for the migration of the data is based at least in part on a designed migration process.

5. The data migration management system of claim 4, wherein the data migration management unit is further configured to determine whether the designed application properly migrates the data stored in the first database to the second database.

6. The data migration management system of claim 1, wherein the player management unit is further configured to manage registration of the player.

7. The data migration management system of claim 1, wherein the player management unit is further configured to provide a predetermined award to the player when the player has successfully accomplished a mission of the game.

8. The data migration management system of claim 1, wherein the player management unit is further configured to charge the player for the game.

9. The data migration management system of claim 1, wherein the player management unit is further configured to design a market in which the player buys or sells the game and to manage the market.

10. The data migration management system of claim 1, wherein the data storage policy of the second database is different from a data storage policy of the first database.

11. A method performed under control of a data migration management system, comprising:
identifying a semantic difference between a first database and a second database;
classifying data stored in the first database into a first portion of data and a second portion of data, the first portion of data being applicable to a bulk migration to the second database and the second portion of data necessitating semantic interpretation for a migration to the second database, wherein the necessitated semantic interpretation, suitable for a game, provides compatibility between the data stored in the first database and a data storage policy of the second database;
designing an application for migrating the second portion of data stored in the first database to the second database; and
designing the game to include a mission associated with the semantic difference between the first database and a second database based at least in part on the designed application.

12. The method of claim 11, further comprising:
migrating the portion of data stored in the first database to the second database by playing the game.

13. The method of claim 11, further comprising:
identifying the necessitated semantic interpretation between the first database and the second database; and
identifying, from the data stored in the first database, the second portion of data.

14. The method of claim 11, further comprising:
requesting a player to play the game; and
revising the application based at least in part on a result of playing of the game by the player.

15. The method of claim 14, further comprising:
validating whether the revised application properly migrates the data stored in the first database to the second database.

16. The method of claim 14, further comprising:
revising the game based at least in part on the revised application.

17. The method of claim 14, further comprising:
providing a predetermined award to the player when the player has successfully accomplished a mission of the game.

18. The method of claim 14, further comprising:
charging the player for the game.

19. The method of claim 11, further comprising:
requesting a player to play the game; and
generating another application based at least in part on a result of playing of the game by the player.

20. The method of claim 19, further comprising:
generating another game based at least in part on the other application.

21. The method of claim 11, further comprising:
providing a market in which the game is traded.

22. A non-transitory computer-readable storage medium having stored thereon computer-executable instructions that, in response to execution, cause a data migration management system to perform operations, comprising:
identifying a semantic difference between a first database and a second database;
classifying data stored in the first database into a first portion of data and a second portion of data, the first portion of data being applicable to a bulk migration to the second database and the second portion of data necessitating semantic interpretation for a migration to the second database, wherein the necessitated semantic interpretation, suitable for a game, provides compatibility between the data stored in the first database and a data storage policy of the second database; and
providing a player with the game designed to include a mission associated with the semantic difference between the first database and a second database to migrate the second portion of data to the second database for playing by a player.

23. The non-transitory computer-readable storage medium of claim 22, wherein the operations further comprise:
migrating the second portion of data from the first database to the second database based at least in part on playing of the game by the player.

24. The non-transitory computer-readable storage medium of claim 22, wherein the operations further comprise:
designing an application for the migration of the second portion of data to the second database; and
migrating the second portion of data from the first database to the second database based at least in part on the designed application.

25. The non-transitory computer-readable storage medium of claim 24, wherein the operations further comprise:
designing the game based at least in part on the designed application.

26. The non-transitory computer-readable storage medium of claim 25, wherein the operations further comprise:
revising the application based at least in part on a result of playing of the game by the player.

* * * * *